United States Patent
Cao et al.

(10) Patent No.: US 12,441,941 B2
(45) Date of Patent: Oct. 14, 2025

(54) UPGRADING PYROLYSIS CARBON

(71) Applicant: ExxonMobil Technology and Engineering Company, Annandale, NJ (US)

(72) Inventors: Guang Cao, Princeton, NJ (US); James R. Bielenberg, Lebanon, NJ (US); August W. Bosse, Pennington, NJ (US); David C. Dankworth, Princeton, NJ (US); Sumathy Raman, Annandale, NJ (US); Michael Siskin, Westfield, NJ (US)

(73) Assignee: Exxon Mobil Technology and Engineering Company, Spring, TX (US)

( * ) Notice: Subject to any disclaimer, the term of this patent is extended or adjusted under 35 U.S.C. 154(b) by 175 days.

(21) Appl. No.: 18/274,021

(22) PCT Filed: Jan. 27, 2022

(86) PCT No.: PCT/US2022/014010
§ 371 (c)(1),
(2) Date: Jul. 25, 2023

(87) PCT Pub. No.: WO2022/169659
PCT Pub. Date: Aug. 11, 2022

(65) Prior Publication Data
US 2024/0425759 A1 Dec. 26, 2024

Related U.S. Application Data

(60) Provisional application No. 63/145,590, filed on Feb. 4, 2021.

(51) Int. Cl.
*C01B 3/24* (2006.01)
*C10G 1/08* (2006.01)

(52) U.S. Cl.
CPC ............ *C10G 1/083* (2013.01); *C01B 3/24* (2013.01); *C01B 2203/065* (2013.01); *C01B 2203/0833* (2013.01); *C01B 2203/0855* (2013.01); *C01B 2203/0861* (2013.01)

(58) Field of Classification Search
CPC ...... C01B 2203/065; C01B 2203/0833; C01B 2203/0855; C01B 2203/0861; C01B 3/24; C10G 1/083
See application file for complete search history.

(56) References Cited

U.S. PATENT DOCUMENTS

| | | | |
|---|---|---|---|
| 3,867,275 A | 2/1975 | Gleim et al. | |
| 4,300,995 A | 11/1981 | Liotta | |
| 4,345,989 A | 8/1982 | Vernon et al. | |
| 4,372,750 A | 2/1983 | Liotta | |
| 4,604,183 A | 8/1986 | Edelson et al. | |
| 5,338,441 A | 8/1994 | LeViness et al. | |
| 2012/0036764 A1* | 2/2012 | Babe | C10G 3/50 44/307 |
| 2015/0144476 A1* | 5/2015 | Anigurkin | C10B 49/04 202/121 |

FOREIGN PATENT DOCUMENTS

| | | | | |
|---|---|---|---|---|
| EP | 0271337 | | 6/1988 | |
| EP | 0271337 A2 * | | 6/1988 | |
| WO | 9312205 | | 6/1993 | |
| WO | WO-2020055254 A1 * | | 3/2020 | ............... C01B 3/32 |

OTHER PUBLICATIONS

International Search Report and Written Opinion for PCT/US2022/014010 dated Apr. 26, 2022.
Ullmann's Encyclopedia of Industrial Chemistry, Carbon, 6. Carbon Black, Manfred Voll, Peter Kleinschmit, Jan. 15, 2010.
Sanchez-Bastardo, N.; Schlogl, R.; Ruland, H. "Methane Pyrolysis for CO2-Free H2 Production: A Green Process to Overcome Renewable Energies Unsteadiness". Chem. Ing. Tech. 2020, 92, 1596-1609.
T.GeiBler, et al., "Hydrogen production via methane pyrolysis in a liquid metal bubble column reactor with a packed bed," Chemical Engineering Journal, vol. 299, Sep. 1, 2016, pp. 192-200.
C. Palmer, et al., "CO2-Free Hydrogen Production by Catalytic Pyrolysis of Hydrocarbon Feedstocks in Molten Ni-Bi," Energy Fuels 2020, published on Nov. 25, 2020.
D. Kang, N. Rahimi, M. J. Gordon, H. Metiu, E. W. McFarland, "Catalytic methane pyrolysis in molten MnCh-KCl," Applied Catalysis B: Environmental 254 (2019) 659-666).
Research, Upham, et al. Catalytic molten metals for the direct conversion of methane to hydrogen and separable carbon, Science 358, 917-921 (Nov. 2017.

(Continued)

*Primary Examiner* — Ellen M McAvoy
*Assistant Examiner* — Chantel Graham
(74) *Attorney, Agent, or Firm* — C. Tumey Law Group PLLC

(57) ABSTRACT

Methods are provided for upgrading of pyrolysis carbon in order to allow for conversion of the pyrolysis carbon into higher value products. Instead of attempting to convert methane into a high value carbon product (such as carbon nanotubes) and $H_2$ in a single reaction step, pyrolysis conditions can be used to form $H_2$ and pyrolysis carbon. The pyrolysis carbon can then be treated in order to convert the pyrolysis carbon (H to C atomic ratio of less than 0.20) into a product with a higher hydrogen content (H to C atomic ratio of 0.25-0.9 or 2.0-7.0 wt % H). The treatment can correspond to exposing the pyrolysis carbon with hydrogen in the presence of a catalyst, exposing the pyrolysis carbon to conditions for alkylation, or a sequential combination thereof. This can convert the pyrolysis carbon into heavy hydrocarbon products that are resin-like solids at room temperature.

24 Claims, No Drawings

(56) References Cited

OTHER PUBLICATIONS

ACS Catalysis, Palmer, et al., Methane pyrolysis with a molten Cu-Bi alloy catalyst, 2019.
Sciencedirect, Parkinson, et al. Methane pyrolysis in monovalent alkali halide salts: Kinetics and pyrolytic carbon properties, 2020.
Chemical Engineering Journal, Parkinson, et al., Molten salt bubble cols. for low-carbon hydrogen from CH4 pyrolysis: mass transfer and carbon formation mechanisms, 2020.

\* cited by examiner

UPGRADING PYROLYSIS CARBON

FIELD OF THE INVENTION

This invention relates to systems and methods for upgrading pyrolysis carbon.

BACKGROUND OF THE INVENTION

Conventional hydrogen production primarily involves steam or dry reforming of methane, partial oxidation of coal or heavy hydrocarbons, and water gas shift processes. In these processes $CO_2$ is a co-product. For the purpose of reducing $CO_2$ (greenhouse gas) emissions, future hydrogen production from fossil fuels or biomass will likely involve carbon capture and sequestration. One of the challenges for carbon capture and sequestration is easy access to locations with sufficient capacity for the $CO_2$ captured.

An alternative to using steam reforming to generate hydrogen is methane pyrolysis (or more generally hydrocarbon pyrolysis). During pyrolysis, methane can be converted into hydrogen and solid carbon, thus avoiding the stoichiometric $CO_2$ production associated with steam reforming.

A number of technologies have been in practice for the pyrolysis of light hydrocarbons, primarily natural gas. The pyrolysis technologies are mostly for the production of carbon blacks (see Ullmann's Encyclopedia of Industrial Chemistry, Carbon, 6. Carbon Black, Manfred Voll, Peter Kleinschmit, First published: 15 Jan. 2010). For example, the Furnace Black and Thermal Black processes pyrolyze natural gas at >1200° C., generating carbon black as the main product and hydrogen as a byproduct. In addition, novel catalytic pyrolysis methods have been reported that aim to improve efficiency. Examples of references describing pyrolysis include a) Sánchez-Bastardo, N.; Schlögl, R.; Ruland, H. "Methane Pyrolysis for $CO_2$-Free $H_2$ Production: A Green Process to Overcome Renewable Energies Unsteadiness". Chem. Ing. Tech. 2020, 92, 1596-1609; b) T. Geißler, et al., "Hydrogen production via methane pyrolysis in a liquid metal bubble column reactor with a packed bed," Chemical Engineering Journal, Volume 299, 1 Sep. 2016, Pages 192-200; c) C. Palmer, et al., "$CO_2$-Free Hydrogen Production by Catalytic Pyrolysis of Hydrocarbon Feedstocks in Molten Ni—Bi," EnergyFuels 2020, published on Nov. 25, 2020; and d) D. Kang, N. Rahimi, M. J. Gordon, H. Metiu, E. W. McFarland, "Catalytic methane pyrolysis in molten $MnCl_2$—KCl," Applied Catalysis B: Environmental 254 (2019) 659-666). It is noted that the Sanchez-Bastardo et al. reference reported metals content in pyrolysis carbon that included 0.73 wt % Ni and 8.3 wt % Bi.

Although pyrolysis does not directly result in $CO_2$ production, a disposition is still needed for the solid carbon product if hydrogen is to be produced as the main product. Since part of the goal of using methane pyrolysis is to avoid $CO_2$ formation, use of the solid carbon as fuel would be undesirable. What is needed are systems and methods that can allow for upgrading of pyrolysis carbon to higher value products while reducing or minimizing any additional $CO_2$ production.

U.S. Pat. No. 5,338,441 describes methods for performing coal liquefaction based on a catalytic process in the presence of hydrogen.

U.S. Pat. No. 4,372,750 describes oxygen alkylation and/or oxygen acylation of coal or coal bottoms in the presence of an organic quaternary base and an organic compound that includes a "leaving group" corresponding to halide, sulfate, bisulfate, acetate, or stearate. A quaternary ammonium compound is an example of an organic quaternary base.

U.S. Pat. No. 4,300,995 describes oxygen alkylation of carbonous material (such as coal) in the presence of a quaternary base (such as a quaternary ammonium compound) at temperatures of 100° C. to 300° C.

U.S. Pat. No. 4,345,989 describes a coal liquefaction process involving exposure of carbonaceous solids to a carbon-alkali metal catalyst in the presence of a hydrogen donor solvent and hydrogen gas.

SUMMARY OF THE INVENTION

In various aspects, a method is provided for upgrading pyrolysis carbon. The method includes combining particles of pyrolysis carbon with a solvent to form a slurry. The pyrolysis carbon can have an atomic hydrogen to carbon ratio of 0.20 or less. The method further includes exposing the particles of pyrolysis carbon to hydrogen in the presence of a catalyst under slurry hydroprocessing conditions to form an upgraded carbon product comprising an atomic hydrogen to carbon ratio of 0.25 or more.

In various further aspects, a method for upgrading pyrolysis carbon is provided. The method includes combining particles of pyrolysis carbon with a solvent to form a slurry. The pyrolysis carbon can have an atomic hydrogen to carbon ratio of 0.20 or less. The method further includes exposing the particles of pyrolysis carbon to a) a quaternary base and optionally at least one of a metal hydroxide and a metal alkoxide under phase transfer catalysis conditions, the solvent comprising a protic solvent; b) an alkyl halide and a metal halide at a temperature of 20° C. to 200° C. and a pressure of 100 kPa-a to 5.0 MPa-a, the metal halide having the stoichiometry $MX_n$ where M is a metal, X is a halogen, and n is an integer between 2 and 6; or c) a combination of a) and b), to form an upgraded carbon product having an atomic hydrogen to carbon ratio of 0.25 or more.

In still further aspects, the methods of upgrading pyrolysis carbon can be performed sequentially, such as by first performing slurry hydroprocessing, and then using the upgraded pyrolysis carbon and/or at least a portion of the slurry hydroprocessing effluent as at least part of the slurry for exposure according to a), b), or c).

DETAILED DESCRIPTION OF THE INVENTION

All numerical values within the detailed description and the claims herein are modified by "about" or "approximately" the indicated value, and take into account experimental error and variations that would be expected by a person having ordinary skill in the art.

Overview

In various aspects, systems and methods are provided for upgrading of pyrolysis carbon in order to allow for conversion of the pyrolysis carbon into higher value products. Instead of attempting to convert methane into a high value carbon product (such as carbon nanotubes) and $H_2$ in a single reaction step, pyrolysis conditions can be used to form $H_2$ and pyrolysis carbon. The pyrolysis carbon can then be treated with hydrogen in the presence of a catalyst in order to convert the pyrolysis carbon (H to C atomic ratio of 0.04-0.20) into a product with a higher hydrogen content (H to C atomic ratio of 0.25-0.9 or 2.0-7.0 wt % H). This can convert the pyrolysis carbon into heavy hydrocarbon products that are tar-like and/or resin-like solids at room temperature, having softening point greater than 200° C. This resin-like substance can then be further processed in order to form higher value materials, such as carbon fiber, thermalset carbon parts, or other carbon-based composite structural materials. It is noted that when processing a conventional petroleum feed, forming a resin-like solid with an atomic H to C ratio of 0.25-0.9 is typically an undesirable outcome. For example, formation of steam cracker tar can be an example of forming a product with an atomic H to C ratio of roughly 0.9 or less. By contrast, for upgrading of pyrolysis carbon, upgrading the pyrolysis carbon to achieve an atomic H to C ratio of 0.25-0.9 or 2.0-7.0 wt % H represents the target outcome.

Additionally or alternatively, in various aspects, systems and methods are provided for upgrading of pyrolysis carbon by addition of alkyl groups to the pyrolysis carbon. The addition of alkyl groups can be performed via alkylation, transalkylation, etherification, and/or esterification of the pyrolysis carbon. Alkylation and/or transalkylation can add alkyl groups directly to carbon atoms that are part of the pyrolysis carbon. Etherification and/or esterification can add alkyl groups to hydroxyl or carboxylate functional groups present in the pyrolysis carbon, such as hydroxyl and/or carboxylate functional groups on or near the surface of the pyrolysis carbon. Addition of alkyl groups to pyrolysis carbon can provide various advantages. For example, addition of alkyl groups can distort and/or expand the bonding network of a carbonaceous material, thus facilitating the ability of reactants to enter and interact with the interior of the pyrolysis carbon. Such distortion and/or expansion can also assist with disruption of $\pi$-bonding networks, thus potentially reducing the barrier to further reactions with the pyrolysis carbon. The addition of alkyl groups also generally increases the atomic ratio of hydrogen to carbon in the pyrolysis carbon.

In still other aspects, pyrolysis carbon can be sequentially hydrogenated and then exposed to conditions for addition of alkyl groups. This can be done, for example, using sequential slurry reactors. By first hydrogenating the pyrolysis carbon, the effectiveness of alkyl group addition can potentially be increased, resulting in a still further upgraded product.

After addition of alkyl groups to pyrolysis carbon, further processes can be performed for conversion of the upgraded pyrolysis carbon to other materials. For example, depending on the nature of the alkyl groups added to the pyrolysis carbon, various further processes can be used to cross-link the upgraded pyrolysis carbon, thus allowing for formation of a structural material.

Pyrolysis carbon refers to carbon-based substances formed during pyrolysis of methane to form hydrogen. The pyrolysis carbon resulting from methane pyrolysis typically has a atomic ratio of hydrogen to carbon of 0.04-0.20. The structure of the pyrolysis carbon is typically approaching graphitic or amorphous, having predominantly $sp^2$ and some $sp^3$ carbons (i.e., carbons with hybridized orbitals corresponding to the combinations of a 2 s orbital with either 2 2p orbitals or 3 2p orbitals), with nanometer-scale domains. It is noted that the structure of pyrolysis carbon is dependent on the conditions with which the carbon is produced. Therefore, the structure of the resulting pyrolysis carbon can be modified based on the pyrolysis conditions that are used to form the pyrolysis carbon. In addition to conventional thermal pyrolysis, catalytic pyrolysis processes are being developed with the use of molten metals or molten salts, as both suspended/dispersed catalysts and heat transfer media and separation media for carbon. In such processes the structure of carbon can be tailored with changes in the catalysts and pyrolysis conditions.

Still another source of pyrolysis carbon can be carbon formed by "pyrolysis" of hydrocarbons during a process involving a plasma reaction environment using gas-stabilized, water stabilized, and/or hybrid gas-water stabilized thermal plasma torches or non-thermal warm plasma like microwave plasma torches. In a plasma reaction environment, the presence of radicals, high reaction temperatures, and short residence times in the core of the thermal plasma jet can facilitate the conversion of at least some carbon atoms from hydrocarbons into a solid carbon product. Solid carbon generated during a plasma process can still have the low hydrogen content, mostly aromatic nature, of other types of pyrolysis carbon. In addition, the pyrolysis carbon formed in the pyrolysis of hydrocarbons using a steam stabilized plasma or gas-water stabilized plasma can contain a few percent of oxygen (15.0 wt % or less). This oxygen is incorporated from the interaction of steam with the surface of the formed pyrolysis carbon. This additional oxygen in pyrolysis carbon formed by such a plasma pyrolysis process can therefore be at least somewhat polar in nature. In this discussion, unless otherwise specified, carbon generated during a plasma process where hydrocarbons are present in a plasma environment is defined to be a type of pyrolysis carbon.

The pyrolysis carbon is different from other types of low hydrogen content carbon-based products. For example, coal is a highly carbonaceous substance with a hydrogen content of roughly 2.0 wt % to 5.0 wt %, or possibly higher. As a result, the atomic ratio of hydrogen to carbon in coal can be roughly 0.25 or higher (on dry basis). However, in addition to having a substantially higher hydrogen content, coal differs from pyrolysis carbon in other ways. Coal has a macromolecular carbon structure, with linkages often provided with heteroatoms such as O, S, and N, as opposed to the nanoscale domains of pyrolysis carbon. Thus, the macromolecular, high heteroatom content structure of coal is substantially different from the mostly aromatic, small domain size structure of pyrolysis carbon, and therefore it is difficult to make any predictive statements about the reactivity of coal versus pyrolysis carbon for a given set of reaction conditions.

In various aspects, the catalytic addition of small amount of hydrogen to pyrolysis carbon can convert solid carbon into a heavier hydrocarbononaceous material having softening points greater than 200° C. Instead of attempting to convert pyrolysis carbon into liquid fuels, in various aspects an upgrading process can be used to convert pyrolysis carbon into a resin-like material. This can be accomplished, for example, by forming a slurry of the pyrolysis carbon and then exposing the slurry of pyrolysis carbon to hydrogen in the presence of a catalyst. Attempting to convert pyrolysis carbon directly into a liquid fuel would require significant consumption of hydrogen, so that the hydrogen to carbon atomic ratio could be increased to a value significantly greater than 1.0. By contrast, in various aspects, a conversion process can be used to upgrade the pyrolysis carbon so that the hydrogen to carbon atomic ratio is 0.25-0.9 and/or the hydrogen content is 2.0 wt % to 7.0 wt %. This upgraded product can then be upgraded further to form structural materials, such as carbon fiber.

Additionally or alternatively, in various aspects alkyl addition (i.e., addition of alkyl groups) can be performed on pyrolysis carbon via alkylation, transalkylation, acylation, etherification, esterification, or a combination thereof. Alkyl addition can optionally be performed after adding hydrogen to the pyrolysis carbon. The alkyl addition can be accomplished, for example, by forming a slurry of pyrolysis carbon and exposing the slurry to conditions for alkyl addition, using alkylating reagents such as alkyl halides. In some aspects, alkyl addition can be used to upgrade the pyrolysis carbon so that the hydrogen to carbon atomic ratio is 0.25-0.9 and/or the hydrogen content is 2.0 wt % to 7.0 wt %. This upgraded product can then be upgraded further to form structural materials, such as cross-linked carbon-based materials.

Upgrading pyrolysis carbon to structural materials rather than fuels can provide other advantages. For example, some types of pyrolysis carbon correspond to pyrolysis carbon formed using a process where methane is pyrolyzed in a molten alkali metal. This results in pyrolysis carbon that includes a substantial content of alkali metal. Even attempting to simply dispose of such alkali metal-laden carbon can require first separating the metal from the carbon, resulting in still further costs. However, these metals impurities in carbon, can have activity for facilitating the partial hydrogenation of carbon for the production of resin-like hydrocarbons. Thus, it can be at least partially beneficial for the metals to be present within the pyrolysis carbon during a hydrogenation step. Additionally, the hydrogenation step can reduce the amount of metal present in the upgraded product. Thus, upgrading pyrolysis carbon for use as structural materials, rather than for production of fuels, can reduce, minimize, or possibly eliminate the need to perform processing steps for metals reduction.

In this discussion, pyrolysis carbon is defined as a carbon-based material that is formed during a process that generates $H_2$ from a hydrocarbon, preferably methane. Pyrolysis carbon is defined as having an atomic ratio of hydrogen to carbon of 0.20 or less, or 0.13 or less, or 0.10 or less, such as down to 0.04. Pyrolysis carbon is further defined as having an oxygen content of 15.0 wt % or less, such as down to having substantially no oxygen content. Carbon-containing materials with sulfur contents greater than 0.5% are excluded from the definition of pyrolysis carbon, as generating a carbon-containing material with such a sulfur content would not be formed from methane pyrolysis.

In this discussion, determining of the composition of pyrolysis carbon and/or an upgraded product can be performed, for example, using a method such as ASTM D6349, which is usually used for analysis of coal samples. For upgraded products that correspond to liquids, a suitable ASTM method for characterization of hydrocarbon liquids can be used instead.

In this discussion, an etherification process is defined as addition of an alkyl group to the oxygen atom of a hydroxyl group at the surface of the pyrolysis carbon, which results in formation of an ether. It is noted that a hydroxyl group at the surface of pyrolysis carbon will typically correspond to a hydroxyl group attached to an aromatic ring, e.g., an aromatic-phenol-type group, due to the highly aromatic nature of pyrolysis carbon. In this discussion, an esterification process is defined as addition of an alkyl group to an oxygen atom that is part of a carboxylic acid group at the surface of the pyrolysis carbon. In this discussion, alkylation is defined as addition of an alkyl group to a carbon atom that is part of the pyrolysis carbon. One type of alkylation is transalkylation, where the alkyl group added to the carbon atom in the pyrolysis carbon corresponds to an alkyl group that is transferred from an aromatic ring of a reagent, solvent, or carrier liquid that is present in the alkylation/transalkylation environment. In this discussion, etherification, esterification, alkylation, and transalkylation are defined as types of alkyl addition for adding an alkyl group to pyrolysis carbon.

Pyrolysis of Methane to Form Pyrolysis Carbon

In principle, a variety of reactor configurations can potentially be suitable for converting methane to form molecular hydrogen and carbon, as shown in Equation (1).

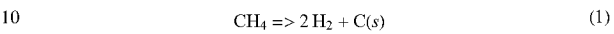

$$CH_4 => 2H_2 + C(s) \qquad (1)$$

As an example, some configurations for performing pyrolysis can correspond to gas phase pyrolysis reactors. In a gas phase pyrolysis reactor, the solid carbon that is formed by the pyrolysis reaction will be cooled and collected downstream of the reactor. If heat transfer particles are used to deliver heat into the reaction environment, at least a portion of the carbon can instead deposit on the heated particles. For example, the pyrolysis can be performed by using the heat transfer particles to form a fluidized bed, so that the pyrolysis reaction occurs in the proximity of the heat transfer particles.

For gas phase pyrolysis of methane, the pyrolysis can be performed by exposing the methane (or other hydrocarbons) to elevated temperatures for an appropriate period of time. In order to achieve pyrolysis of methane, the temperature of the pyrolysis conditions can be 1000° C. or more, or 1100° C. or more, or 1200° C. or more, or 1300° C. or more, or 1400° C. or more, such as up to 1600° C. or possibly still higher. The average residence time for the methane at the pyrolysis temperature can range from 0.1 seconds to 500 seconds, or 0.1 seconds to 100 seconds, or 1 second to 100 seconds. The pyrolysis mixture is typically quenched by water (steam) before carbon is separated from $H_2$ gas. This exposure to $H_2O$ might introduce oxygen into the pyrolysis carbon.

Another option for performing pyrolysis can be to use a molten media environment. In this type of reactor, a metal or other media having catalytic activity for catalyzing pyrolysis can be heated to a molten or liquid state to serve as the heating media. The methane (and/or other hydrocarbons) can then be bubbled or otherwise passed through the molten metal environment to cause pyrolysis. An advantage of the molten metal environment is that using a molten metal provides a better thermal conductor than a gas phase environment. This can mitigate some of the difficulties with maintaining the pyrolysis temperature within the reactor. However, this also means that the solid carbon forms within the molten metal environment. Thus, the solid carbon has to be recovered from the molten metal. Additionally, even after recovery, the solid carbon can still contain substantial amounts of the metal used to form the molten metal environment.

Some options for the molten media can be molten metals, which can include iron, nickel, aluminum, lead, bismuth, tin, alloys, or a combination thereof, or any other metal that exhibits suitable catalytic activity for facilitating a pyrolysis reaction. Other options for the molten media can include a mechanical mixture of a metal and a solid media, such as silicon carbide. The molten metal is kept at a temperature sufficient to provide adequate conversion kinetics for substantial conversion of methane to hydrogen and carbon-containing particles. For example, the molten metal can be maintained at a temperature in the range of about 600° C. to about 1300° C., about 700° C. to about 1200° C., or about 800° C. to about 1100° C. During operation, a hydrocarbon feed can be passed through the molten media under pressure to perform pyrolysis. For example, a methane or natural gas feed at a pressure in the range 1.0-5.0 bar-a (~100 kPa-a to ~500 kPa-a) can be passed through the molten media to form $H_2$ and solid pyrolysis carbon.

The pyrolysis carbon formed from gas phase pyrolysis, molten media pyrolysis, plasma pyrolysis, or other conventional pyrolysis systems can be in the form of a low hydrogen content, low oxygen content material. The atomic ratio of hydrogen to carbon is typically less than 0.1. The resulting structure for the pyrolysis carbon is amorphous or graphitic, with nano-scale domains that are potentially graphite-like in nature.

In some aspects, modifications can be made to the pyrolysis process in order to generate a pyrolysis carbon with an atomic hydrogen to carbon ratio of 0.1 to 0.2. Increasing the initial hydrogen content of the pyrolysis carbon can be beneficial for achieving an upgraded carbon product with an atomic hydrogen to carbon ratio of 0.25 to 0.9.

Depending on the nature of the pyrolysis process, the pyrolysis carbon can also include various types of metals. Such metals can include transition metals, such as Ni, Sn, Bi, Co, Mn, or Fe, as well as alkali metals, such as Na or K. The amount of transition metals in the pyrolysis carbon can range from 0.1 wt %-10 wt %. The amount of alkali metals in the pyrolysis carbon can range from 0.2-2.5%. Pyrolysis carbon can potentially also contain sulfur, such as 0 wt % to 0.2 wt % of sulfur, or 0.01 wt %-0.2% wt % of sulfur.

Upgrading of Pyrolysis Carbon-Hydrogenation

In various aspects, instead of attempting to add sufficient hydrogen to pyrolysis carbon to upgrade the pyrolysis carbon to fuel products, the pyrolysis carbon can be upgraded to a carbon-containing product with an atomic hydrogen to carbon ratio of 0.25 to 0.9, or 0.25 to 0.7, or 0.25 to 0.5, or 0.4 to 0.9, or 0.4 to 0.7. Additionally or alternatively, the pyrolysis carbon can be upgraded to a hydrogen content of 2.0 wt % to 7.0 wt %, or 2.0 wt % to 5.5 wt %, or 2.0 wt % to 4.0 wt %, or 3.5 wt % to 7.0 wt %, or 3.5 wt % to 5.5 wt %. This can be achieved by forming a slurry of the pyrolysis carbon and then hydroprocessing the slurry.

Other features of the upgraded carbon-containing product can also be characterized. For example, the upgraded product can be characterized based on a softening point (similar to the procedure for determining a softening point for an asphalt product or resin, such as according to ASTM E28). In some aspects, the softening point of the upgraded product can be 200° C.-400° C. Another way of characterizing can be based on measuring micro carbon residue (MCR, sometimes also referred to as Conradson carbon content, measured according to ASTM D4530), and the Micro Carbon Residue Test (MCRT) number is in the range of 20-90 wt %.

It is noted that in conventional slurry hydroprocessing, the goal of the slurry hydroprocessing is to produce liquid products with boiling range of 38° C. to 300° C. For processing of heavy oils, the feed starts out as a liquid and the "slurry" corresponds to catalyst particles suspended within the liquid. For coal liquefaction, the initial feed corresponds to coal particles, but the desired products are liquids formed from the solids. Any solids remaining after the coal liquefaction represent an undesired by-product.

In contrast to conventional slurry hydroprocessing, in some aspects the desired products from processing of the pyrolysis carbon correspond to either solid particles or high viscosity liquids that are insoluble in the carrier liquid or "solvent" that is used for the slurry hydroprocessing reaction. The carrier liquid facilitates the slurry hydroprocessing by allowing more intimate mixing of catalyst with the particles of the pyrolysis carbon. But unlike conventional slurry hydroprocessing, the desired products from hydroprocessing of pyrolysis carbon can be separated from the slurry using separation techniques that are suitable for liquid solid separations. In other aspects, at least a portion of the products from upgrading the pyrolysis carbon can correspond to liquid products.

To form a slurry, the pyrolysis carbon can first be physically processed so that the pyrolysis carbon is in the form of small particles that are suitable for formation of a slurry. If the pyrolysis carbon is already in the form of particles, the physical processing step can be optional. Grinding is an example of a suitable method for physically processing the pyrolysis carbon to form small particles and/or reduce the particle size, but any convenient type of physical processing can be used. In some aspects, the pyrolysis carbon can be physically processed to have a maximum particle size of 1.0 cm or less, or 0.7 cm or less, such as down to 0.05 cm or possibly still lower. In some aspects, the pyrolysis carbon can be physically processed to have an average particle size of 1.0 cm or less, or 0.7 cm or less, such as down to 0.05 cm or possibly still lower. In this discussion, maximum particle size and average particle size are defined based on the diameter of the smallest bounding sphere that can contain a particle. In some aspects, the pyrolysis carbon can have a particle size corresponding to 8 mesh or less.

After any (optional) physical processing, the pyrolysis carbon can be combined with a carrier liquid or solvent to form a slurry. Solvents useful in this invention include any of the solvents or diluents known in the prior art to be useful in the liquefaction of coal and similar solid carbonaceous materials. When a solvent having donatable hydrogen is to be used, any of the solvents or diluents known in the prior art to contain donatable hydrogen can be used in the improved process of this invention. Suitable hydrogen-donor solvents containing at least 1.00 wt. % donatable hydrogen include pure compounds as well as mixtures of such compounds in combination with components which will not donate hydrogen at liquefaction conditions. Compounds which will donate hydrogen during liquefaction are believed well known in the prior art and many are described in U.S. Pat. No. 3,867,275. These include the dihydronaphthalenes, the $C_{10}$-$C_{12}$ tetrahydronaphthalenes, the hexahydrofluorenes, the dihydro-, tetrahydro-, hexahydro- and octahydrophenanthrenes, the $C_{12}$-$C_{13}$ acenaphthenes, the tetrahydro-, hexahydro- and decahydropyrenes, the di-, tetra- and octahydroanthracenes, and other derivatives of partially saturated aromatic compounds. Heteroaromatic hydrogen donors such as tetrahydroquinoline can also be used. Still other examples of solvents include toluene and alpha-methylnaphthalene. Yet other examples of solvents can include alkylated aromatic compounds, such as toluene, xylene, ethylbenzene, and alpha-methylnaphthalene. The donor hydrogen solvent can be prepared by subjecting a distillate stream from atmospheric distillation to a conventional hydrogenation reactor. In some aspects, mixed solvents can include one or more vacuum gas oil fractions with a T10 distillation point of 343° C. or more and a T90 distillation point of 538° C. or less. This stream comprises aromatics, hydrogenated aromatics, naphthenic hydrocarbons, phenolic materials, and similar compounds. If a solvent is used which does not have donatable hydrogen, hydrogen may be added from another source, such as the hydrogen treat gas used in the slurry hydroprocessing.

The concentration of pyrolysis carbon in the slurry can correspond to any convenient concentration. In some aspects, the slurry can include 5.0 vol % to 80 vol % of pyrolysis carbon particles relative to a total volume for the slurry, or 10 vol % to 60 vol %, or 15 vol % to 50 vol %, or 20 vol % to 40 vol %.

Catalysts with hydrogenation activity may be used in the slurry hydroprocesssing. Such catalysts can include one or more metals of Groups 4, 5, 6, 7, 8, 9, 10, or 12 of the IUPAC Periodic Table of the Elements. Generally, the catalyst or a precursor thereof will be added to the slurry entering the mixing zone in a form which is readily dispersible or soluble in the solvent or diluent used during liquefaction. Suitable compounds (precursors) convertible to active catalysts under process conditions include (1) inorganic metal compounds such as halides, oxyhalides, hydrated oxides, heteropoly acids (e.g., phosphomolybdic acid, molybdosilisic acid); (2) metal salts of organic acids such as acyclic and alicyclic aliphatic carboxylic acids containing two or more carbon atoms (e.g., toluic acid); sulfonic acids (e.g., toluenesulfonic acid); sulfinic acids; mercaptans, xanthic acid; phenols, di- and polyhydroxy aromatic compounds; (3) organometallic compounds such as metal chelates, e.g., with 1,3-diketones, ethylene diamine, ethylene diamine tetraacetic acid, phthalocyanines, etc.; (4) metal salts of organic amines such as aliphatic amines, aromatic amines, and quaternary ammonium compounds. Examples of suitable metals include zinc, cadmium, mercury, tin, lead, vanadium, niobium, tantalum, chromium, molybdenum, tungsten, manganese, rhenium, iron, cobalt, nickel, and mixtures thereof. In some aspects, the catalyst compounds or precursors can be oil soluble metal compounds containing a metal corresponding to and/or consisting of molybdenum, vanadium, chromium, and combinations thereof. Examples of catalyst and/or precursor compounds of a metal include the salts of acyclic (straight or branched chain) aliphatic carboxylic acids, salts of alicyclic aliphatic carboxylic acids, heteropolyacids, hydrated oxides, carbonyls, phenolares and organo amine salts. Other examples of metal compounds can include a salt of an alicyclic aliphatic carboxylic acid such as a metal naphthenate. Still other examples of metal compounds are the heteropoly acid, e.g., phosphomolybdic acid as well as oil soluble and/or highly dispersible molybdenum complexes.

The catalyst or catalyst precursor can be added to the slurry at a concentration within the range from 20 wppm to 6000 wppm, based on active metal, by weight of pyrolysis carbon. Since the desired upgraded carbon-containing product is a solid soluble in hydrocarbon solvents (toluene or xylenes, for example), a solvent extraction process can be used to recover the upgraded carbon products, and unreacted carbon would be expected to be part of any "bottoms" fraction that might be formed from the slurry. Thus, at least a portion of the slurry can be withdrawn to allow for recovery of upgraded carbon-containing particles. In some aspects where recycle is used, the catalyst or catalyst precursor can be added in a concentration of 20 wppm to 2000 wppm, in order to achieve a concentration of 30 wppm to 6000 wppm in the reactor stage. When multiple stages are employed the catalyst concentration in any particular stage may vary due to different amounts of bottoms recycled to different stages but the catalyst concentration within any given stage or zone can be within the aforementioned range of 30 wppm to 6000 wppm, based on active metal components, by weight of total solids.

The reaction conditions within a slurry hydroprocessing reactor that correspond to a target conversion level can include a temperature of 300° C. to 480° C., or 400° C. to 480° C., such as 425° C. or more, or 450° C. or more. Some types of slurry hydroprocessing reactors are operated under high hydrogen partial pressure conditions, such as having a hydrogen partial pressure of 1000 psi (6.9 MPa) to 3400 psi (23.4 MPa), for example at least 1200 psi (8.3 MPa), or at least about 1500 psi (10.3 MPa). Examples of hydrogen partial pressures can be 1000 psi (6.9 MPa) to 3000 psi (20.7 MPa), or 1000 psi (6.9 MPa) to 2500 psi (17.2 MPa), or 1500 psi (10.3 MPa) to 3400 psi (23.4 MPa), or 1000 psi (6.9 MPa) to 2000 psi (13.8 MPa), or 1200 psi (8.3 MPa) to 2500 psi (17.2 MPa). The average residence time for the pyrolysis carbon under the slurry hydroprocessing conditions can range from less than 2 minutes to 200 minutes, depending on the flow rate(s) and recycle rate(s) in the slurry hydroprocessing stage(s).

In some aspects, the hydrogen content of the products from slurry hydroprocessing (i.e., wt % of hydrogen in the upgraded carbon product) can be greater than the hydrogen content of the pyrolysis carbon (i.e., wt % of hydrogen in the pyrolysis carbon) by 0.5 wt % to 3.0 wt %, or 0.5 wt % to 2.5 wt %, or 1.0 wt % to 3.0 wt %, or 1.0 wt % to 2.5 wt %. In other aspects, higher amounts of hydrogen can be added, so that a weight percent of hydrogen in the upgraded carbon product is greater than a weight percent of hydrogen in the pyrolysis carbon by 0.5 wt % to 6.0 wt %, or 0.5 wt % to 4.5 wt %, or 0.5 wt % to 2.5 wt %, or 1.0 wt % to 6.0 wt %, or 1.0 wt % to 4.5 wt %, or 1.0 wt % to 2.5 wt %, or 2.5 wt % to 6.0 wt %, or 2.5 wt % to 4.5 wt %. To make this comparison, two values can be calculated. One value is the weight percentage of hydrogen in the upgraded carbon product. This weight percentage is calculated based on the weight of hydrogen in the upgraded carbon product relative to the total weight of the upgraded carbon product. The other value is the weight percentage of hydrogen in the pyrolysis carbon (prior to upgrading). This weight percentage is calculated based on the weight of hydrogen in the pyrolysis carbon relative to the total weight of the pyrolysis carbon.

After exposure to the slurry hydroprocessing conditions, the upgraded carbon-containing product can be separated from the carrier liquid/solvent by any convenient method for separation of solids or highly viscous liquids from a lower viscosity fluid. This can include filtration, centrifugal separation, use of settling tanks, or other methods.

Upgrading of Pyrolysis Carbon-Alkyl Addition

In various aspects, another general route for increasing the atomic ratio of hydrogen to carbon in the pyrolysis carbon can be via alkyl addition, such as methyl addition. Various types of alkyl addition can also be performed using slurry processing. The alkyl addition can correspond to alkylation, transalkylation, etherification, esterification, or a combination thereof.

To form a slurry, the pyrolysis carbon can first be physically processed so that the pyrolysis carbon is in the form of small particles that are suitable for formation of a slurry. If the pyrolysis carbon is already in the form of particles, the physical processing step can be optional. Grinding is an example of a suitable method for physically processing the pyrolysis carbon to form small particles and/or reduce the particle size, but any convenient type of physical processing can be used. In some aspects, the pyrolysis carbon can be physically processed to have a maximum particle size of 1.0 cm or less, or 0.7 cm or less, such as down to 0.05 cm or possibly still lower. In some aspects, the pyrolysis carbon can be physically processed to have an average particle size of 1.0 cm or less, or 0.7 cm or less, such as down to 0.05 cm or possibly still lower. In this discussion, maximum particle size and average particle size are defined based on the diameter of the smallest bounding sphere that can contain a particle. In some aspects, the pyrolysis carbon can have a particle size corresponding to 8 mesh or less.

A slurry can then be formed. The slurry can include the pyrolysis carbon and a carrier liquid or solvent. The carrier liquid or solvent used for alkyl addition can be dependent on the type of alkyl addition process.

In aspects where the alkyl addition corresponds to an alkylation process, there are various strategies available for selecting a carrier liquid or solvent. For alkylation processes, such as alkylation by a Friedel-Crafts type process, it can be beneficial to select a solvent that can reduce or minimize reaction of the Friedel-Crafts reagents with the solvent or carrier liquid. Because a Friedel-Crafts-type process is designed to add alkyl groups to an aromatic ring, some suitable solvents/carrier liquids can correspond to alkanes (including cycloalkanes) that have low reactivity with the Friedel-Crafts-type reagents. Some examples of alkanes include n-hexane, n-heptane, 2-methylhexane, cyclohexane, and methyl-cyclohexane. It is noted that the prior list includes alkanes containing either 6 or 7 carbon atoms. More generally, n-alkanes, branched alkanes (such as 2-methyl-hexane), cycloalkanes, and substituted cycloalkanes (such as methyl-cyclohexane) containing 5 to 20 carbon atoms can be used as solvents. Other potential solvents/carrier liquids can correspond to aromatic hydrocarbons that are resistant to alkyl addition. Nitrobenzene is an example of a solvent/carrier liquid that is resistant to alkyl addition, due to the fact that the "nitro" group in nitrobenzene acts as an electron withdrawing functional group. Still other potential solvents can correspond to solvents such as acetonitrile (methylnitrile).

The above strategy for selecting a solvent during alkylation can be modified if it is desired to also perform transalkylation. During transalkylation, an alkyl group is transferred from an aromatic ring in a first compound to an aromatic ring in a second compound. Thus, in order to perform transalkylation, an aromatic ring with available alkyl groups is needed. In such aspects, compounds such as toluene, xylene, ethylbenzene, and/or other alkyl-substituted aromatic hydrocarbons can be used as at least a portion of the solvent, as such compounds can also provide alkyl groups for performing transalkylation. More exhaustive alkylation of the carbon substrate can be used as a source for further transalkylation.

When performing alkylation and/or transalkylation, reagents for performing the alkylation/transalkylation process can also be added. Such reagents can correspond to Friedel-Crafts-type reagents. Generally, suitable reagents can correspond to a combination of an alkyl halide (such as a methyl halide) with a strong Lewis acid. Examples of alkyl halides include alkyl chlorides, such as methyl chloride, methyl bromide, or methyl iodide. More generally, $C_1$-$C_4$ alkyl halides can be used (meaning alkyl halides containing 1 to 4 carbon atoms), including alkyl chlorides, alkyl bromides, and alkyl iodides. Such alkyl halides can include halogenated alkanes and/or halogenated alkenes. Examples of Lewis acids include aluminum chloride ($AlCl_3$), boron trifluoride, ferric chloride ($FeCl_3$), tantalum pentafluoride and/or other metal halide compounds. Such a Lewis acid can have a stoichiometry of $MX_n$, where M is a metal, X is a halide, and n is an integer from 2 to 6.

During alkylation and/or transalkylation, the Friedel-Crafts reagents can be exposed to the pyrolysis carbon in the slurry at a temperature of 20° C. to 200° C., or 50° C. to 200° C., or 100° C. to 200° C. The pressure during alkylation and/or transalkylation can be 100 kPa-a to 5.0 MPa-a (14.7 psi-a to 7,000 psi-a). The average residence time for the pyrolysis carbon under the slurry Friedel-Crafts processing conditions can range from roughly 2 minutes to 200 minutes, depending on the flow rate(s) and recycle rate(s) in the slurry stage(s).

In aspects where the alkyl addition corresponds to etherification and/or esterification, a different strategy for selecting a solvent or carrier liquid can be used. Etherification and/or esterification can be performed using Phase Transfer Catalyzed (PTC) alkylation, where an alkyl group is transferred from an alkyl halide in the presence of a quaternary base to an available oxygen atom at the surface of the pyrolysis carbon. To facilitate phase transfer catalyzed alkylation, the solvent or carrier liquid can correspond to an ether or a protic solvent, such as water or a $C_1$-$C_{20}$ alcohol.

In addition to the solvent or carrier liquid, the reagents for performing a PTC alkylation process can include a quaternary base and a metal base. The quaternary base can be, for example, a quaternary ammonium compound. Quaternary ammonium compounds include a central nitrogen atom that is bonded to four alkyl groups. The alkyl groups can be the same, or each alkyl group can be independently selected, such as from $C_1$-$C_{20}$ alkyl groups. In some aspects, each alkyl group can correspond to a $C_1$ to $C_4$ alkyl group. In some aspects, the quaternary ammonium compound can correspond to a tetramethyl ammonium compound, a tetraethyl ammonium compound or a tetrabutyl ammonium compound. The quaternary base is typically added as a hydroxide salt (example: tetramethylammonium hydroxide). The metal base can correspond to a metal hydroxide (such as NaOH) or a metal alkoxide (such as $NaOCH_3$). Generally, the metal alkoxide can correspond to a $C_1$-$C_{20}$ alkoxide. It is noted that using a metal alkoxide may be beneficial when an alcohol is used as at least a portion of the solvent. In some aspects, when an alcohol is used as at least a portion of the solvent, the metal alkoxide can be selected so that the alkoxide is the conjugate base of the alcohol. It is further noted that the PTC O-alkylation can be facilitated/enhanced by brief exposure of the pyrolysis carbon to air (oxygen) at or near reaction temperature prior to hydrogenation and/or alkylation to increase the level of oxygen functionality on the surface of the carbon.

During etherification and/or esterification, the reagents can be exposed to the pyrolysis carbon in the slurry at a temperature of 20° C. to 200° C., or 50° C. to 200° C., or 100° C. to 200° C. The pressure during etherification and/or esterification can be 100 kPa-a to 5.0 MPa-a. The average residence time for the pyrolysis carbon under the slurry etherification and/or esterification conditions can range from roughly 2 minutes to 200 minutes, depending on the flow rate(s) and recycle rate(s) in the slurry stage(s).

Based on the addition of alkyl groups to the pyrolysis carbon, the hydrogen content of the upgraded carbon product can be increased relative to the hydrogen content of the pyrolysis carbon (prior to upgrading by hydrogenation and/or alkyl addition). In some aspects, the hydrogen content of the products (i.e., wt % of hydrogen in the upgraded carbon product) can be greater than the hydrogen content of the pyrolysis carbon (i.e., wt % of hydrogen in the pyrolysis carbon) by 0.5 wt % to 6.0 wt %, or 0.5 wt % to 4.5 wt %, or 0.5 wt % to 2.5 wt %, or 1.0 wt % to 6.0 wt %, or 1.0 wt % to 4.5 wt %, or 1.0 wt % to 2.5 wt %, or 2.5 wt % to 6.0 wt %, or 2.5 wt % to 4.5 wt %. To make this comparison, two values can be calculated. One value is the weight percentage of hydrogen in the upgraded carbon product. This weight percentage is calculated based on the weight of hydrogen in the upgraded carbon product relative to the total weight of the upgraded carbon product. The other value is the weight percentage of hydrogen in the pyrolysis carbon (prior to upgrading). This weight percentage is calculated based on the weight of hydrogen in the pyrolysis carbon relative to the total weight of the pyrolysis carbon.

After alkyl addition, the upgraded carbon-containing product can be separated from the carrier liquid/solvent by any convenient method for separation of solids or highly viscous liquids from a lower viscosity fluid. This can include filtration, centrifugal separation, use of settling tanks, or other methods.

Other features of the upgraded carbon-containing product can also be characterized. For example, the upgraded product can be characterized based on a softening point (similar to the procedure for determining a softening point for an asphalt product or resin, such as according to ASTM E28). In some aspects, the softening point of the upgraded product can be 200° C.-400° C. Another way of characterizing can be based on measuring micro carbon residue (MCR, sometimes also referred to as Conradson carbon content, measured according to ASTM D4530), and the Micro Carbon Residue Test (MCRT) number is in the range of 20-90 wt %.

Upgrading of Pyrolysis Carbon-Sequential Processing

In some aspects, a series of slurry processing steps can be used to upgrade pyrolysis carbon. In such aspects, one or more initial slurry processing steps can be used to hydrogenate the pyrolysis carbon, followed by one or more additional slurry processing steps for performing alkyl addition. Without being bound by any particular theory, it is believed that due to the relatively mild conditions for alkyl addition, performing hydrogenation on pyrolysis carbon as an initial upgrading step can increase the amount of alkyl addition that can be performed.

In some aspects, sequential hydrogenation and alkyl addition can be performed without performing a separation between the hydrogenation and alkyl addition stages to replace and/or modify the solvent. In other aspects, a separation can be performed between the hydrogenation and alkyl addition stages in order to remove at least a portion of the solvent from the hydrogenation stage prior to adding a solvent for the alkyl addition stage.

In some aspects, the solvent used during slurry hydroprocessing for hydrogenation can correspond to an alkylated aromatic compounds, such as toluene, xylene, ethylbenzene, and alpha-methylnaphthalene. In such aspects, the effluent from the slurry hydroprocessing can be passed into a slurry alkyl addition stage for performing etherification or esterification while retaining the majority of the solvent from the hydrogenation stage. In such aspects, after performing hydrogenation, the effluent from the slurry hydrogenation stage can be substantially passed into a second slurry stage. The etherification and/or esterification can then be performed in the presence of the components from the slurry hydrogenation effluent, including any partially upgraded portions of the pyrolysis carbon as well as any hydrogenation catalyst that may be present.

It is noted that in aspects where at least a portion of the effluent from slurry hydroprocessing is passed into an alkyl addition stage, some adjustment of the processing conditions can occur between stages. In particular, the reaction conditions for performing slurry hydrogenation can include a temperature of 300° C. or more and a pressure of 7.0 MPa-a or more. By contrast, the reaction conditions for alkyl addition can include a temperature of 200° C. or less and a pressure of 100 kPa-a to 5.0 MPa-a. The cooling and pressure reduction between stages can be performed by any convenient method.

In other aspects, one or more separations can be performed between a hydrogenation stage and an alkyl addition stage. For example, when the alkyl addition stage corresponds to a PTC alkyl addition stage, the solvents for hydrogenation can be different from the solvents for PTC alkyl addition. In such an aspect, the partially upgraded pyrolysis carbon from the slurry hydroprocessing stage can be separated in a conventional manner, and then passed into the slurry processing stage for the PTC alkyl addition. Optionally, the solvent for the PTC alkyl addition stage can be added to the partially upgraded pyrolysis carbon prior to addition to the PTC alkyl addition stage, as forming the slurry may at least partially facilitate transport of the partially upgraded pyrolysis carbon into the next processing stage.

Further Processing of the Upgraded Carbon-Containing Product

After hydrogenation, alkyl addition, or sequential hydrogenation and alkyl addition, the upgraded pyrolysis carbon, which corresponds to an upgraded carbon-containing product, can be separated from the other components present in the final slurry processing stage. As an initial separation, a solid-liquid separation can be performed to separate the upgraded carbon-containing product from the portion of the pyrolysis carbon that remains unreacted. An advantage of performing this initial separation is that any metals initially present in the pyrolysis carbon tend to stay with the unreacted portion of the pyrolysis carbon after the slurry processing. As a result, the upgraded carbon-containing product can have a reduced or minimized metal content relative to the metal content of the initial pyrolysis carbon. In some aspects, the metal content of the upgraded carbon-containing product can be lower than the metal content of the initial pyrolysis carbon by 50 wt % or more relative to the weight of metal in the initial pyrolysis carbon, or 70 wt % or more, or 90 wt % or more, such as up to the upgraded pyrolysis carbon product having substantially no metal content (i.e., a metal reduction of 100 wt %). It is noted that any solid catalyst in the slurry can also be substantially removed along with the unreacted pyrolysis carbon.

After separating out the unreacted pyrolysis carbon, the upgraded carbon-containing product can be separated from the solvent and/or liquid reaction products by any convenient method, such as by distillation.

After recovery of the upgraded carbon-containing product, the upgraded product can be used as a starting feed for formation of and/or incorporation into structural materials. In some aspects, the upgraded carbon-containing product can be incorporated directly into a material. In other aspects, additional processing can be performed on the upgraded product, such as cross-linking of the upgraded product. The cross-linking can be based on thermal cross-linking, e.g., of a dimethylated product and/or cross-linking based on a cross-linking additive that is added to the upgraded product. Suitable cross-linking agents can include, but are not limited to, sulfur, formaldehyde, $O_2$, conjugated dienes, and/or divinylbenzene.

With regard to cross-linking, once alkyl functional groups are on the aromatic rings of the pyrolysis carbon (such as by etherification, esterification, alkylation, or transalkylation), a variety of options are available for performing cross-linking. One option can be to use a mild pyrolysis process to performing cross-linking, such as by heating the upgraded pyrolysis carbon to a temperature of 350° C. to 450° C., with or without $H_2$. Another option can be to perform thermal conversion in the presence of water or of ethers and/or esters that were introduced by etherification or esterification. Still other options for subsequent thermal or chemical treatment of the upgraded pyrolysis carbon into structural materials may include, but are not limited to, addition of cross-linking agents such as formaldehyde, oxygen, S, sulfuric acid, sulfonic acids, phosphoric acid, and/or alkylphosphonic acids. These functionalities are not only beneficial for the cross-linking of the carbon materials themselves, but also for cross-linking with other materials, for example with inorganic materials to form carbon-inorganic composite materials.

Additional Embodiments

Embodiment 1. A method for upgrading pyrolysis carbon, comprising: combining particles of pyrolysis carbon with a solvent to form a slurry, the pyrolysis carbon comprising an atomic ratio of hydrogen to carbon of 0.20 or less; and exposing the particles of pyrolysis carbon to hydrogen in the presence of a catalyst under slurry hydroprocessing conditions to form an upgraded carbon product comprising an atomic ratio of hydrogen to carbon of 0.25 or more.

Embodiment 2. The method of Embodiment 1, further comprising exposing at least a portion of the upgraded carbon product to a) a quaternary base and optionally at least one of a metal hydroxide and a metal alkoxide under phase transfer catalysis conditions in the presence of a protic solvent; b) an alkyl halide and a metal halide at a temperature of 20° C. to 200° C. and a pressure of 100 kPa-a to 5.0 MPa-a in the presence of a second solvent, the metal halide having the stoichiometry $MX_n$ where M is a metal, X is a halogen, and n is an integer between 2 and 6; or c) a combination of a) and b), to form a sequentially upgraded carbon product comprising an atomic hydrogen to carbon ratio of 0.25 or more.

Embodiment 3. The method of Embodiment 2, wherein the slurry hydroprocessing conditions produce a slurry hydroprocessing effluent comprising the upgraded carbon product, and wherein exposing at least a portion of the upgraded carbon product comprises exposing 50 vol % or more of the slurry hydroprocessing effluent, the second solvent comprising at least a portion of the solvent, the method optionally further comprising: separating the at least a portion of the upgraded carbon product from the slurry hydroprocessing effluent; and mixing the upgraded carbon product with the protic solvent or the second solvent prior to the exposing the at least a portion of the upgraded carbon product.

Embodiment 4. A method for upgrading pyrolysis carbon, comprising: combining particles of pyrolysis carbon with a solvent to form a slurry, the pyrolysis carbon comprising an atomic hydrogen to carbon ratio of 0.20 or less; and exposing the particles of pyrolysis carbon to a) a quaternary base and optionally at least one of a metal hydroxide and a metal alkoxide under phase transfer catalysis conditions, the solvent comprising a protic solvent; b) an alkyl halide and a metal halide at a temperature of 20° C. to 200° C. and a pressure of 100 kPa-a to 5.0 MPa-a, the metal halide having the stoichiometry $MX_n$ where M is a metal, X is a halogen, and n is an integer between 2 and 6; or c) a combination of a) and b), to form an upgraded carbon product comprising an atomic hydrogen to carbon ratio of 0.25 or more.

Embodiment 5. The method of any of the above embodiments, wherein the upgraded carbon product comprises an atomic hydrogen to carbon ratio of 0.25 to 0.9, or wherein the upgraded carbon product comprises a hydrogen content of 2.0 wt % to 7.0 wt %, or wherein the sequentially upgraded carbon product comprises an atomic hydrogen to carbon ratio of 0.25 to 0.9, or wherein the sequentially upgraded carbon product comprises a hydrogen content of 2.0 wt % to 7.0 wt %, or a combination of two or more thereof.

Embodiment 6. The method of any of the above embodiments, wherein the pyrolysis carbon comprises an atomic hydrogen to carbon ratio of 0.13 or less, or wherein the pyrolysis carbon comprises an atomic hydrogen to carbon ratio of 0.10 or less.

Embodiment 7. The method of any of the above embodiments, wherein the particles of pyrolysis carbon comprise an average particle size of 1.0 cm or less, or wherein the particles of pyrolysis carbon comprise a maximum particle size of 1.0 cm or less, or a combination thereof.

Embodiment 8. The method of any of the above embodiments, wherein the upgraded carbon product comprises a softening point of 200° C. or higher, or wherein the sequentially upgraded carbon product comprises a softening point of 200° C. or higher.

Embodiment 9. The method of any of the above embodiments, the method further comprising physically processing a pyrolysis carbon feed to form the particles of pyrolysis carbon.

Embodiment 10. The method of any of the above embodiments, wherein the particles of pyrolysis carbon comprises a sulfur content of 0.5 wt % or less, or wherein the particles of pyrolysis carbon comprise a sulfur content of 0.01 wt % to 0.2 wt %.

Embodiment 11. The method of any of the above embodiments, wherein the particles of pyrolysis carbon comprise a transition metals content of 0.1 wt % to 10 wt %, or wherein the particles of pyrolysis carbon comprise an alkali metals content of 0.2 wt % to 2.0 wt %, or a combination thereof.

Embodiment 12. The method of any of the above embodiments, wherein the particles of pyrolysis carbon comprise pyrolysis carbon derived from pyrolysis of hydrocarbons in a molten media environment, or wherein the particles of pyrolysis carbon comprise pyrolysis carbon derived from pyrolysis of hydrocarbons in at least one of a thermal plasma environment and a microwave plasma environment.

Embodiment 13. The method of any of the above embodiments, wherein a weight percent of hydrogen in the upgraded carbon product is greater than a weight percent of hydrogen in the pyrolysis carbon by 6.0 wt % or less.

Embodiment 14. The method of any of the above embodiments, wherein the slurry hydroprocessing conditions comprise a temperature of 300° C. to 480° C. and a hydrogen partial pressure of 6.9 MPa to 23.4 MPa; or wherein the slurry comprises 5.0 vol % to 80 vol % of particles of pyrolysis carbon, relative to a total volume of the slurry; or a combination thereof.

Embodiment 15. An upgraded carbon product formed according to the method of any of Embodiments 1 to 14.

Additional Embodiment A. The method of Embodiment 4, wherein the phase transfer catalysis conditions comprise a temperature of 20° C. to 200° C. and a pressure of 100 kPa-a to 5.0 MPa-a, or wherein the particles of pyrolysis carbon are exposed to an alkyl halide and a metal halide, and wherein the solvent comprises an alkyl-substituted aromatic, or a combination thereof.

Additional Embodiment B. The method of any of Embodiments 1 to 14, wherein the upgraded carbon product comprises a solid.

Additional Embodiment C. The method of any of Embodiments 1 to 14, the method further comprising incorporating the upgraded carbon product into a structural material.

Additional Embodiment D. The method of any of Embodiments 1 to 14, wherein the upgraded carbon product is used for production of carbon fiber, thermal-set carbon parts, other carbon-based composite structural materials, or a combination thereof.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for upgrading pyrolysis carbon, comprising:
   combining particles of pyrolysis carbon with a solvent to form a slurry, the pyrolysis carbon comprising an atomic hydrogen to carbon ratio of from 0.04 to 0.20; and
   exposing the particles of pyrolysis carbon to hydrogen in the presence of a catalyst under slurry hydroprocessing conditions to form an upgraded carbon product comprising an atomic hydrogen to carbon ratio of 0.25 or more; wherein the pyrolysis carbon comprises carbon-based substances formed during pyrolysis of methane to form hydrogen.

2. The method of claim 1, wherein the upgraded carbon product comprises an atomic hydrogen to carbon ratio of 0.25 to 0.9, or wherein the upgraded carbon product comprises a hydrogen content of 2.0 wt % to 5.0 wt %, or a combination thereof.

3. The method of claim 1, wherein the pyrolysis carbon comprises an atomic hydrogen to carbon ratio of 0.13 or less.

4. The method of claim 1, wherein the particles of pyrolysis carbon comprise an average particle size of 1.0 cm or less, or wherein the particles of pyrolysis carbon comprise a maximum particle size of 1.0 cm or less, or a combination thereof.

5. The method of claim 1, wherein the upgraded carbon product comprises a softening point of 200° C. or higher.

6. The method of claim 1, the method further comprising physically processing a pyrolysis carbon feed to form the particles of pyrolysis carbon.

7. The method of claim 1, the method further comprising incorporating the upgraded carbon product into a structural material.

8. The method of claim 1, wherein the particles of pyrolysis carbon comprise a sulfur content of 0.5 wt % or less.

9. The method of claim 1, wherein the particles of pyrolysis carbon comprise a sulfur content of 0.01 wt % to 0.2 wt %.

10. The method of claim 1, wherein the particles of pyrolysis carbon comprise a transition metals content of 0.1 wt % to 10 wt %, or wherein the particles of pyrolysis carbon comprise an alkali metals content of 0.2 wt % to 2.0 wt %, or a combination thereof.

11. The method of claim 1, wherein the particles of pyrolysis carbon comprise pyrolysis carbon derived from pyrolysis of hydrocarbons in a molten media environment, or wherein the particles of pyrolysis carbon comprise pyrolysis carbon derived from pyrolysis of hydrocarbons in at least one of a thermal plasma environment and a microwave plasma environment, or a combination thereof.

12. The method of claim 1, wherein the upgraded carbon product comprises a solid.

13. The method of claim 1, wherein a weight percent of hydrogen in the upgraded carbon product is greater than a weight percent of hydrogen in the pyrolysis carbon by 6.0 wt % or less.

14. The method of claim 1, wherein the slurry hydroprocessing conditions comprise a temperature of 300°° C. to 480° C. and a hydrogen partial pressure of 6.9 MPa to 23.4 MPa, or wherein the slurry comprises 5.0 vol % to 80 vol % of particles of pyrolysis carbon, relative to a total volume of the slurry, or a combination thereof.

15. The method of claim 1, further comprising exposing at least a portion of the upgraded carbon product to
   a) a quaternary base and optionally at least one of a metal hydroxide and a metal alkoxide under phase transfer catalysis conditions in the presence of a protic solvent;
   b) an alkyl halide and a metal halide at a temperature of 20° C. to 200° C. and a pressure of 100 kPa-a to 5.0 MPa-a in the presence of a second solvent, the metal halide having the stoichiometry $MX_n$ where M is a metal, X is a halogen, and n is an integer between 2 and 6; or
   c) a combination of a) and b),
   to form a sequentially upgraded carbon product comprising an atomic hydrogen to carbon ratio of 0.25 or more.

16. The method of claim 15, wherein the slurry hydroprocessing conditions produce a slurry hydroprocessing effluent comprising the upgraded carbon product, and wherein exposing at least a portion of the upgraded carbon product comprises exposing 50 vol % or more of the slurry hydroprocessing effluent, the second solvent comprising at least a portion of the solvent.

17. The method of claim 15, wherein the slurry hydroprocessing conditions produce a slurry hydroprocessing effluent comprising the upgraded carbon product, the method further comprising:
   separating the at least a portion of the upgraded carbon product from the slurry hydroprocessing effluent; and
   mixing the upgraded carbon product with the protic solvent or the second solvent prior to the exposing the at least a portion of the upgraded carbon product.

18. The method of claim 15, wherein the sequentially upgraded carbon product comprises a softening point of 200° C. or higher.

19. The method of claim 15, The method of claim 1, wherein a weight percent of hydrogen in the upgraded carbon product is greater than a weight percent of hydrogen in the pyrolysis carbon by 6.0 wt % or less.

20. A method for upgrading pyrolysis carbon, comprising:
   combining particles of pyrolysis carbon with a solvent to form a slurry, the pyrolysis carbon comprising an atomic ratio of hydrogen to carbon of from 0.04 to 0.20; and
   exposing the particles of pyrolysis carbon to
   a) a quaternary base and optionally at least one of a metal hydroxide and a metal alkoxide under phase transfer catalysis conditions, the solvent comprising a protic solvent;
   b) an alkyl halide and a metal halide at a temperature of 20° C. to 200° C. and a pressure of 100 kPa-a to 5.0 MPa-a, the metal halide having the stoichiometry $MX_n$ where M is a metal, X is a halogen, and n is an integer between 2 and 6; or
   c) a combination of a) and b),
   to form an upgraded carbon product comprising an atomic hydrogen to carbon ratio of 0.25 or more; wherein the pyrolysis carbon comprises carbon-based substances formed during pyrolysis of methane to form hydrogen.

21. The method of claim 20, wherein the phase transfer catalysis conditions comprise a temperature of 20° C. to 200° C. and a pressure of 100 kPa-a to 5.0 MPa-a.

22. The method of claim 20, wherein the particles of pyrolysis carbon are exposed to an alkyl halide and a metal halide, and wherein the solvent comprises an alkyl-substituted aromatic.

23. The method of claim 20, i) wherein the particles of pyrolysis carbon comprise a transition metals content of 0.1 wt % to 10 wt %, ii) wherein the particles of pyrolysis carbon comprise an alkali metals content of 0.2 wt % to 2.0 wt %, iii) wherein a total weight of metals in the upgraded carbon product is lower than a total weight of metals in the pyrolysis carbon by 50 wt % or less relative to the total weight of metals in the pyrolysis carbon, or iv) a combination thereof.

24. The method of claim 20, wherein a weight percent of hydrogen in the upgraded carbon product is greater than a weight percent of hydrogen in the pyrolysis carbon by 6.0 wt % or less.

* * * * *